Sept. 5, 1933.  P. L. CHANDLER  1,925,789
JAR COVER
Filed Oct. 19, 1931    2 Sheets-Sheet 1

Inventor
Philip L. Chandler
By
Lynn H. Latta
Attorney

Sept. 5, 1933.   P. L. CHANDLER   1,925,789
JAR COVER
Filed Oct. 19, 1931    2 Sheets-Sheet 2

Patented Sept. 5, 1933

1,925,789

UNITED STATES PATENT OFFICE 1,925,789

JAR COVER

Philip L. Chandler, Thurston, Nebr., assignor of one-half to Harry A. Chandler, Sioux City, Iowa Application October 19, 1931. Serial No. 569,663

1 Claim. (Cl. 215—56)

My invention relates to jar covers generally, and more particularly to a jar cover to be used in the process known as "cold packing".

One of the objects of my invention is to provide a jar cover which will result in a superior method of handling after the contents of the jar have been boiled or cooked.

Another object of my invention is to provide a jar cover which will allow complete covering of the jar during the cooking process.

A further object of my invention is to provide a convenient means, in jar covers, for allowing escape of steam from the jar without resorting to the necessity of loosening the jar cover as is necessary with the usual type of cover.

A still further object of my invention is to provide a jar cover which will accomplish the foregoing results in the most simple manner.

Another object of my invention is to provide a jar cover which will be simple and easy to manufacture.

When these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
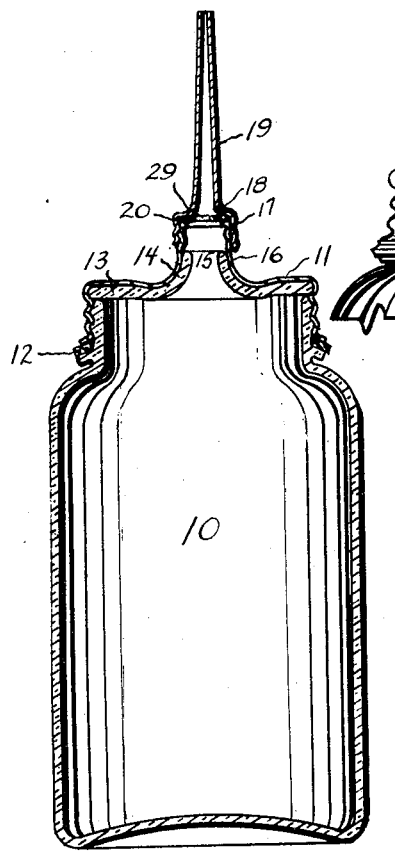
Figure 1 is a sectional view showing a complete jar with the cover attached, taken on the axis thereof.
Figure 2:
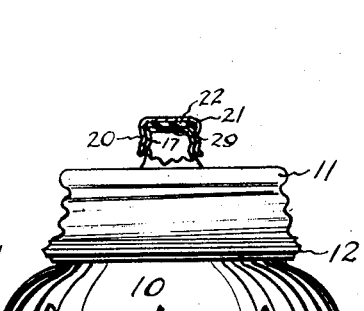
Figure 2 is a side elevation of the upper part of Figure 1, showing the small auxiliary cap attached, in section.
Figure 3:
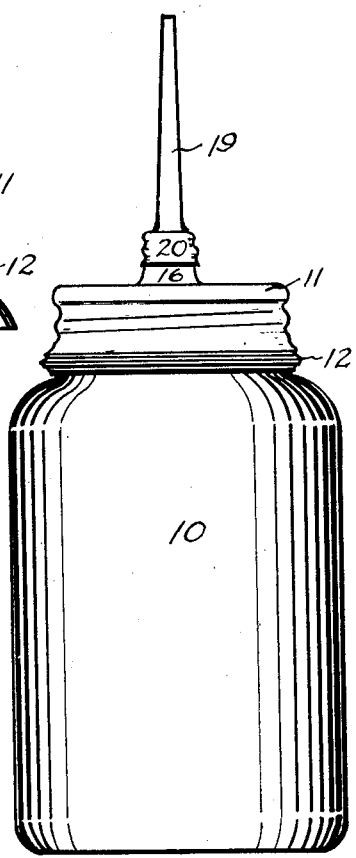
Figure 3 is an external view of Figure 1.
Figure 4:
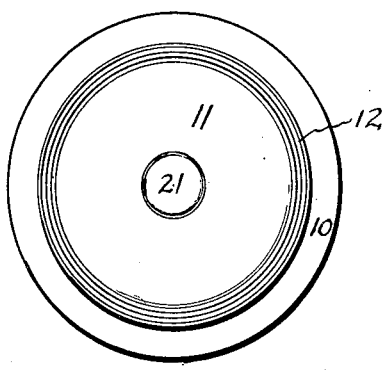
Figure 4 is a plan view of Figure 2.
Figure 5:
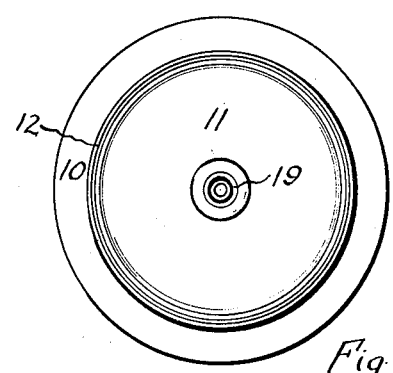
Figure 5 is a plan view of Figure 3.
Figure 6:
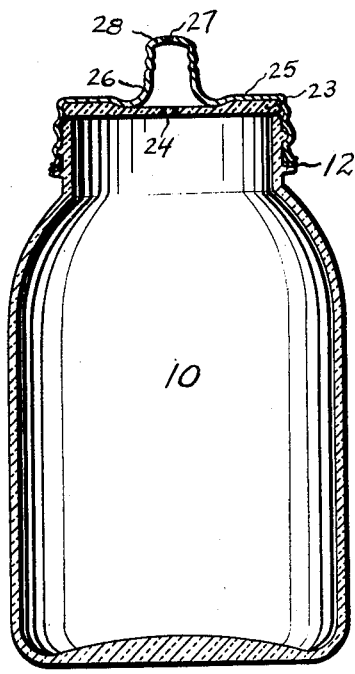
Figure 6 is a sectional view taken along the axis of a jar, and a modified form of the invention.
Figure 7:
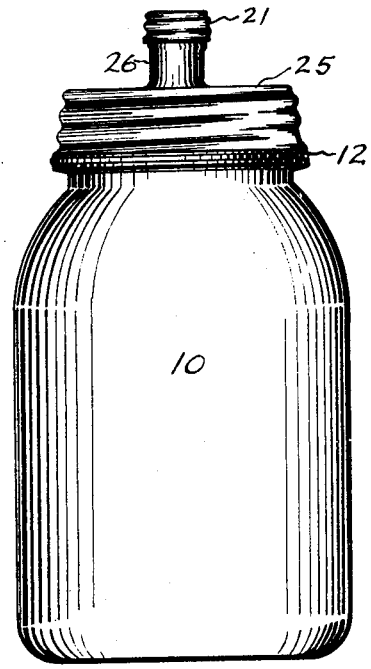
Figure 7 is an external view of Figure 6, with the auxiliary cap attached.
Figure 8:
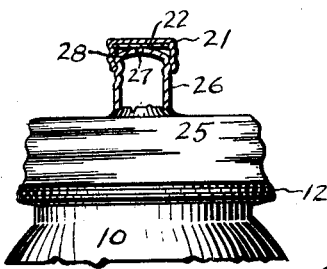
Figure 8 is an external upper view of Figure 7, with the cap portion sectioned to show its construction.
Figure 9:
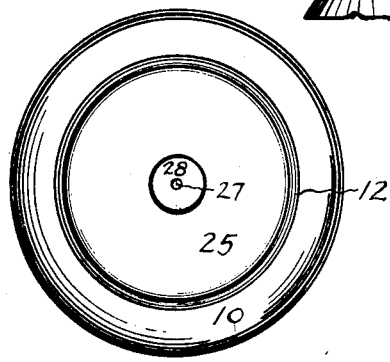
Figure 9 is a plan view of Figure 6.
Figure 10:
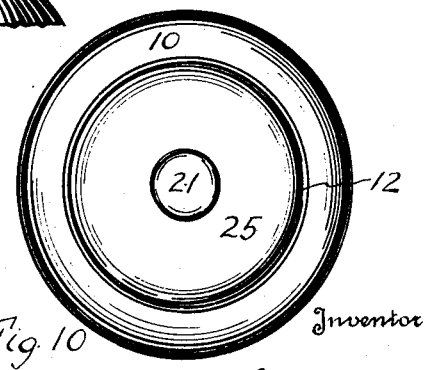
Figure 10 is a plan view of Figure 7.

I have used the reference character 10 to designate the fruit jar throughout.

As shown in Figure 1, I provide the regular form of cap 11, which is screwed down against the gasket 12, and I have also provided the porcelain or glass disc 13, which in this case includes the raised boss 14, which includes the opening 15.

The jar cover 11 is provided with a raised boss 16, the upper part of which includes the threaded element 17, and the opening 29.

I further provide the gasket 18 upon which the spout 19 is screwed against by means of the threaded portion 20 of the spout 19, which threaded portion engages the threaded portion 17.

I further provide an auxiliary cap 21 which contains the gasket 22. It will now be necessary to explain the operation of this device.

In the usual method of "cold pack", cold meats, fruits, and so forth, are placed in a jar with sufficient water, and several of these jars are placed in a vessel containing water. The height of the water in the vessel generally is up to approximately one-half the height of the jar. The reason for this is that when the water boils in the vessel, the consequent boiling action resulting in eruptions and splashing of the water, will force water into the jar itself, since in the usual way, the jar cover must be slightly loosened to allow escape of steam resulting from the cooking of the mixture inside the jar, and as explained, it is therefore necessary to keep the level of the water in the vessel comparatively low so that the aforesaid eruptions and splashing of water will not result in the dilution of the inside contents of the jar.

In my invention, it is not necessary to loosen the jar cover since I have provided the spout 19 which provides an opening at its upper end for the escape of steam. In using my cover, the liquid in the vessel can be placed at a comparatively high level. In fact, it can cover the jar entirely, thus allowing for more complete and uniform cooking of the contents of the jar, and no water can get into the jar since all of the joints are well gasketed as shown.

After the cooking operation has taken place, the spout 19 is removed, and the auxiliary cap 21 is screwed onto the top of the jar cover, thus sealing the jar efficiently when the jar is put away.

Furthermore, I have remedied a certain condition with this invention which is as follows.

During the cooking process, the usual type of jar cover gets hot, and it is inconvenient for the housewife or person doing the cooking to again screw the cover down against the gasket since the entire jar cover must be grasped in one hand while holding the jar with the other, whereas, in my invention, all that is necessary is to remove the spout and screw the small auxiliary cap 21 down firmly since the rest of the jar cover is already screwed down. This cap can be screwed down quite easily without touching the rest of the jar.

The jar cover and spout can be made with any material, such as, zinc and so forth, which is well known in the art, and the gaskets can be of rubber, celluloid, or like materials.

It will be noted in Figure 1, that I have provided the raised boss 14 in the porcelain disc 13 to prevent the contents of the jar from coming in contact with the metallic cover.

In Figures 6 to 10 inclusive, I have shown a modified form of the invention, in which the porcelain disc 23 is provided with the opening 24. The cover 25 is provided with the raised boss 26, which in this case is made slightly higher than the boss 16 as shown in Figure 1. A very small opening 27 is provided in the topmost portion of the boss 26, the top of the boss being slightly rounded as at 28.

With this form of the device, it would not be necessary to use the spout 19 since the opening 27 is so small that although it will permit the escape of steam, it would not allow the entrance of water, since the water in splashing would tend to roll down the curved slope 28 of the boss 26.

Furthermore, this small opening 27 is made so small that water would not enter due to its surface tension.

In this latter form of the device, the auxiliary cap 21 can be used in the same manner, except that the gasket 22 will close the opening 27 at its center.

It will be seen that I have provided a simple and inexpensive jar cover, which will insure complete cooking of the contents of the jar without any of the attendant handicaps prevalent in the old type of jar cover when used in this way.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

In combination with a jar cover, a porcelain disc within the cover and conforming thereto and including an opening, a raised integral boss positioned centrally on the cover, and means for allowing escape of steam from a jar, said means comprising the boss having an opening, and a spout threadably attached to the boss.

PHILIP L. CHANDLER.